April 29, 1930.     A. O. AUSTIN     1,756,233
OUTLET FOR MULTIPLE CONDUCTOR CABLES
Filed March 16, 1927     2 Sheets-Sheet 1

INVENTOR
Arthur O. Austin
BY Nissen & Crane
ATTORNEYS

Patented Apr. 29, 1930

1,756,233

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

OUTLET FOR MULTIPLE-CONDUCTOR CABLES

Application filed March 16, 1927. Serial No. 175,656.

This invention relates to outlet housings or potheads for high potential multiple conductor cables and has for its object the provision of an outlet housing which will permit the separation of the conductors of the cable without impairing the efficiency of the insulation. Further specific objects will appear from the following description.

The invention is exemplified in the combination and arrangement of parts shown in the accompanying drawings and described in the following specification and it is more particularly pointed out in the appended claims.

In the drawings—

The average dielectric strength of multiple conductor cables is usually lowered at the point of outlet or where the potheads are applied. Considerable time and expense is also involved in making multiple conductor outlets.

Figure 1:
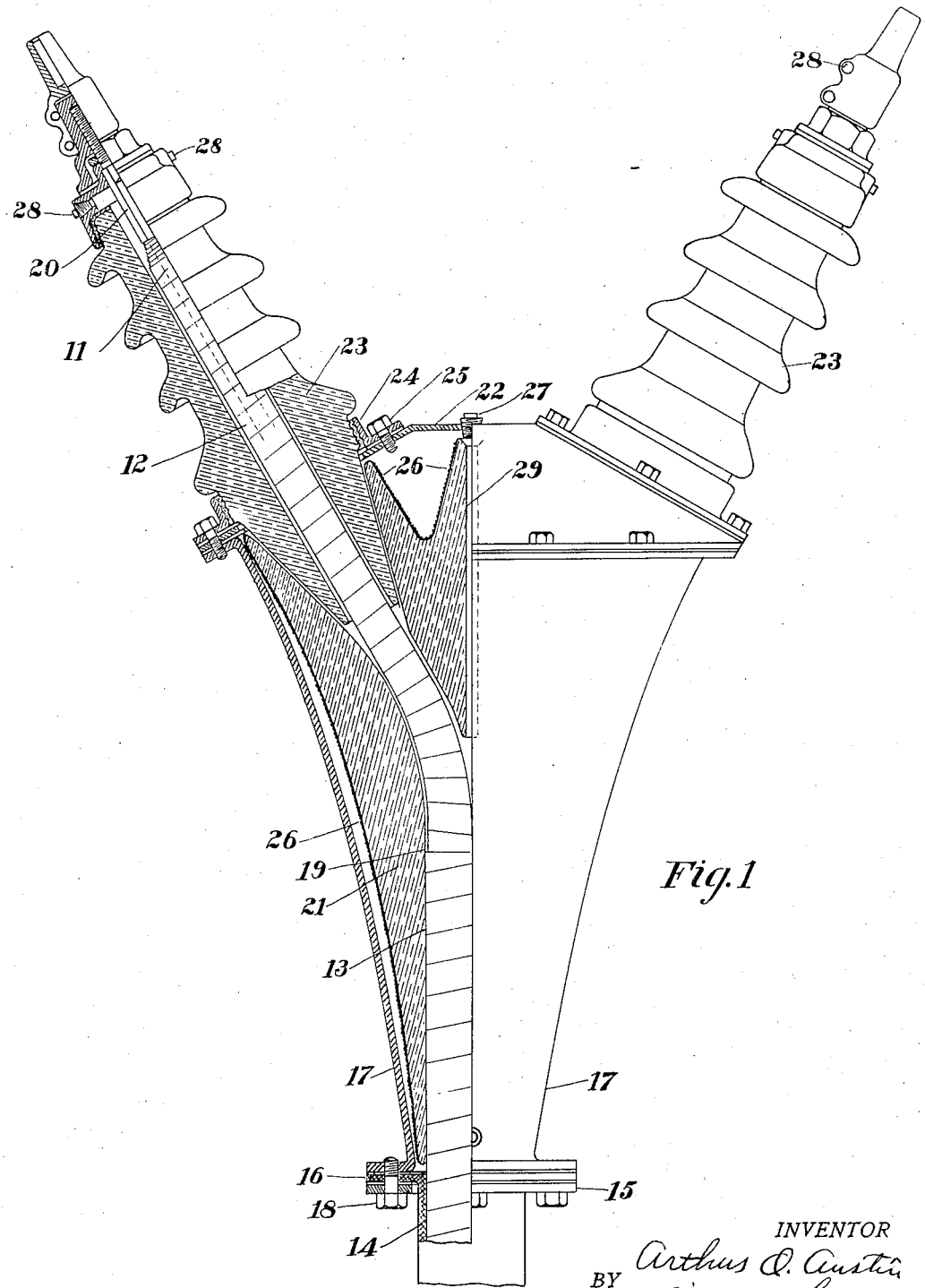
Fig. 1 is an elevation partly in section illustrating one embodiment of the present invention.

In order to develop the dielectric strength of the cable and also to provide a multiple conductor pothead which can be easily installed, I have devised a new type, one form of which is shown in Fig. 1. One form of multiple conductor cable has the separate conductors 11 covered by insulation 12. There may be several of these conductors bound together and covered with an additional layer of insulator 13. The several conductors with the additional insulation 13 are covered by a lead sheath 14.

In Fig. 1 the lead sheath 14 is removed the required distance, the flange or collar 15 is slipped over the sheath and the lead sheath turned outward as at 16. The metal shell 17 may then be clamped against the lead by tightening up the bolts 18. An additional gasket may be used to take care of any irregularity but in general the lead will form a tight joint. The outer layer of insulation just previously being stripped to the point 19 the cable may then have the terminal bolts 20 attached to the individual conductors. The terminal bolts 20 with the conductors attached may then be threaded up through the flange member 21 which is composed of a dielectric such as porcelain or glass or a moulded composition. The cover plate 22 may then be bolted to the metal shell 17. Openings for the terminal bushings 23 are provided in the cover plate. The terminal bushings 23 with attached flanges 24 may then be placed down over the conductor and clamped tightly by the bolts 25.

In the form of the multiple pothead shown, charging current is controlled by the use of metallized surfaces 26. The flange piece 21 is very thin at the point of entry of the three conductors and gradually recedes from the surface so that any electrostatic stress is picked up gradually by the dielectric member and the possibility of charging current flowing along the surface of the insulation is eliminated. This is particularly true where the dielectric member is composed of a material which has a high specific inductive or flux carrying capacity, as the electrostatic flux flows through more readily, which tends to eliminate the charging current flowing along the surface of the cable insulation. The charging current is one of the chief sources of damage and frequently limits the voltage which may be safely placed on the cable.

The branch block 21 is provided with conical openings into which the tapered ends of the terminal bushings 23 fit. These conical openings are placed in projections of a general cylindrical form, the outer surfaces of which are metallized and in electrical contact with the casing 17 and conductor sheath 14. Owing to the dielectric flux flowing through the walls of the projections or cones there is little danger of the charging current or leakage occurring along the joint between the members 23 and 21 as there is considerable separation between the metallized surface and the cable. The dielectric members 21 and 23 will take up a large portion of the electrical stress and thereby relieve the cable insulation. This gradual reduction of the stress limits any possibility of charging current flowing along the insulator covering of the cable which is very essential to prevent damage to the conductor, particularly where the cable is operated at high voltages. After the terminal insulators 23 are in place, the space between the cable and insulating members and between the insulating members and metal case may be filled with oil or insulating compound by removing the plug 27 or 28. The filling is greatly facilitated by placing a screened hole 29. This hole is formed in a conical projecting member, the outside of which is metallized. The metallized surface extending well along the hole tends to reduce the possibility of a discharge down through it. This hole makes it very easy to fill the space where the several conductors part and if desired any slight space in the parting may be filled with wicking or material which will tend to eliminate any discharge.

In general, a pothead of this description consists of a main branch member having projections for the exit of cables. These projections usually have conical craters into which terminal bushing members fit although it is evident that the members 23 and the branch member 21 can, in some cases all be made in one piece. The dielectric members have the outer surfaces coated or metallized so that charging current tending to flow along the cable sheath is eliminated. Where the metallic members are closed to the surface or where the voltage is compared to the thickness of the dielectric members, the metallized surface may be eliminated as general electric conditions would approximately be the same.

Figure 2:
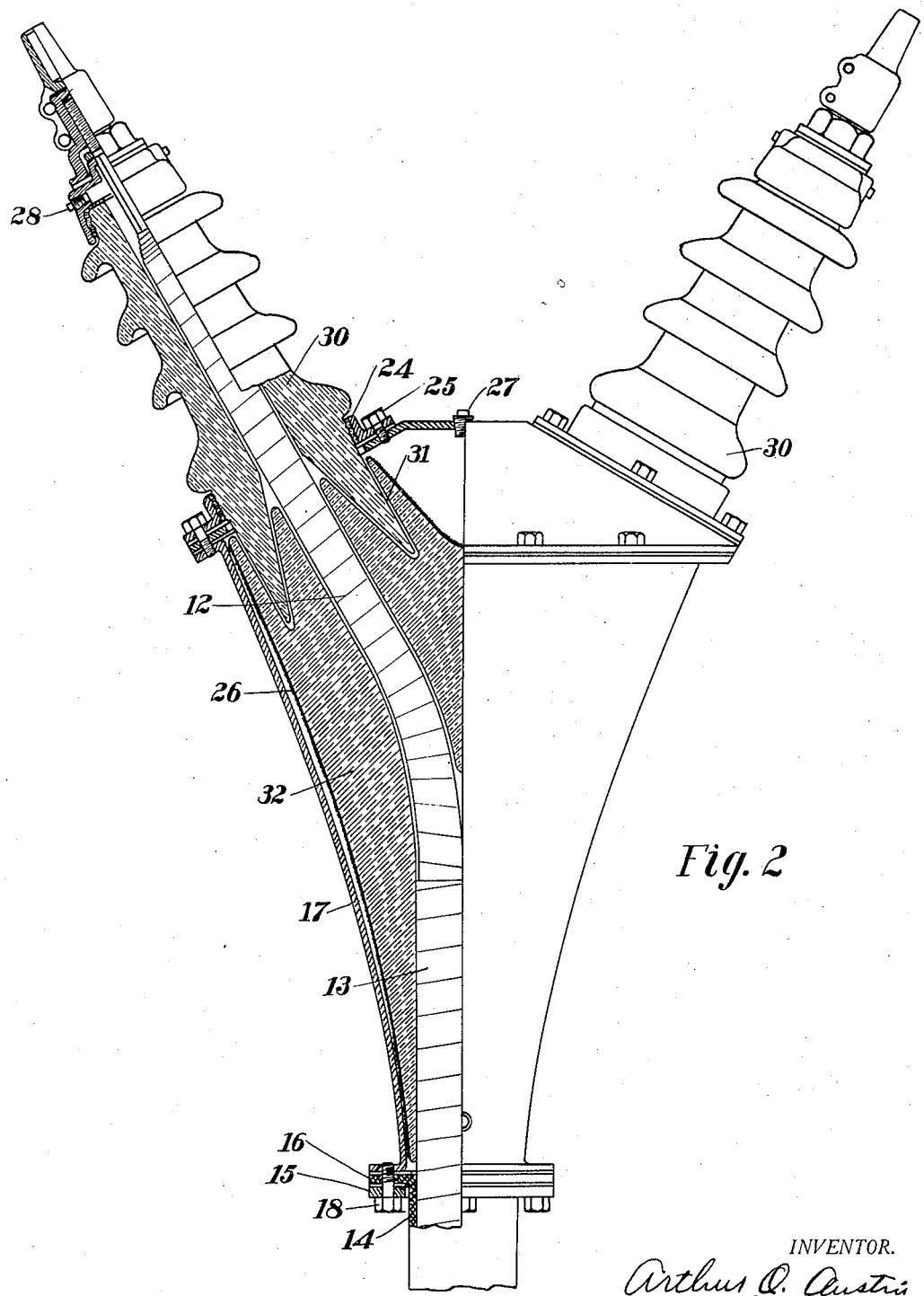
Fig. 2 is a view similar to Fig. 1 showing a different form of the invention.

In the form shown in Fig. 2, the general arrangement is the same as in Fig. 1 with the exception that the terminal bushings 30 fit into annular grooves 31 in the branch block 32. This arrangement gives a longer leakage path in the joint but in general, is more difficult to form.

I claim—

1. The combination with a multiple conductor cable having an outer metallic sheath, of a body of solid dielectric material having a main passage therein for receiving said cable and having branch passages for the individual conductors of said cable, said main and branch passages being completely encircled by the material of said body, said body being tapered toward the entrance of said cable to said main passage and a metal housing tapered to conform to the surface of said body of dielectric material and disposed adjacent thereto and connected to said sheath.

2. The combination with a multiple conductor cable having the conductors thereof separately covered with insulating material and having an insulating covering enclosing all of said conductors and having an outer metallic sheath, of a body of solid dielectric material having a main passage for receiving said cable and having branch passages for distributing the conductors of said cable, said main and branch passages being completely encircled by the material of said body, said sheath being terminated adjacent the entrance of said cable into the main passage in said body, a metal housing connected with said sheath at the termination thereof and gradually tapered outwardly, said body of dielectric material being tapered to fit between the inner wall of said housing and the outer surface of the dielectric covering for said cable.

3. The combination with a multiple conductor cable having the conductors thereof separately insulated and having an outer metal sheath, of a distributing block of solid dielectric material having a main passage therein for receiving said cable and having branch passages for distributing the conductors of said cable, said main and branch passages being completely encircled separately by the material of said block, said distributing block having tapered projections covered with conducting material surrounding said branch passages at the exit of the conductors from said block.

4. The combination with a multiple conductor cable having the conductors thereof separately insulated, of a distributing block having a passage therein for receiving said cable and having branch passages for the distribution of the conductors of said cable, said branch passages being arranged in divergent relation and being surrounded by projections on said distributing block at the points of exit of said conductors from said block and a conducting covering for said projections and for the portion of said block adjacent the entrance of said cable thereto.

5. The combination with a multiple conductor cable having the conductors thereof separately insulated and having a metal sheath surrounding said cable, of a distributing block of dielectric material having a passage therein for receiving said cable and having divergent branch passages for the distributing of said conductors, said block being tapered toward the surface of said cable at the point of entrance thereof into said block and having projections thereon surrounding said conductors at the points of exit thereof the outer surface of said block having a conducting coating thereon and a housing for enclosing said block.

6. The combination with a multiple conductor cable having separately insulated conductors and a metallic sheath of a distributing block of dielectric material having a passage therein for receiving said cable and having divergent branch passages for distributing the conductors of said cable, said block being tapered toward said cable at the point of entrance thereof and having projections thereon surrounding said conductors adjacent their points of exist, conducting material closely adjacent and conforming to the outer surface of said projections, a metallic housing enclosing said block and electrically connected with said sheath and conducting material and dielectric bushings extending through said housing and surrounding said conductors where they emerge from said housing.

7. The combination with a multiple conductor cable having separately insulated conductors of a distributing block of dielectric material having a passage therein for receiving the body of said cable and having branch passages for the individual conductors and projections surrounding the branch passages at their exists from said block said branch passages being flared outwardly at their outer ends, a housing enclosing said distributing block and dielectric bushings extending through the wall of said housing for enclosing the conductors where they pass through said wall said bushings having tapered inner ends fitted into the flared ends of said branch passages.

8. The combination with a multiple conductor cable having separately insulated conductors of a distributing block of dielectric material having a passage for receiving the main body of said conductor cable and having branch passages for the separate conductors, projections on said distributing block surrounding the outer ends of said branch passages being flared outwardly at the outer ends thereof, bushing insulators having tapered portions fitted into the flared ends of said branch passages, a housing enclosing said distributing block and having perforations through the wall thereof for receiving said bushing insulators said bushing insulators being mounted on the wall of said housing and a metallic coating surrounding the projections on said distributing block.

9. The combination with a multiple conductor cable having separately insulated conductors of a distributing block having a passage for receiving the main body of said cable and branch passages for the several conductors, a housing for said distributing block, a metal sheath on the main body of said cable terminating at the point of entrance of said cable to said housing and secured to said housing, said housing being flared outwardly from said cable, the distributing block being tapered to fit between the housing and cable, projections on said distributing block surrounding the outer ends of said branch passages, insulator bushings having center openings registering with the openings of said branch passages and extending through openings in the wall of said housing for surrounding said conductors where they extend through said wall, said bushing insulators having their inner ends inter-fitted with the ends of the projections on said bushing block and a metallic covering surrounding the projections on said bushing block and the tapered portion of said block surrounding the main body of said cable.

10. The combination with a multiple conductor cable having separately insulated conductors of a dielectric distributing block having a passage for receiving the main body of said cable and having diverging branch passages for the conductors, a housing enclosing said distributing block having openings therethrough for the exit of said conductors, bushing insulators mounted in said openings, projections on said distributing block surrounding the outer ends of said branch passages and registering with the inner ends of said bushing insulators, said bushing insulators and projections having inter-fitting portions comprising circular grooves formed in said projections and circular flanges on the ends of said bushing insulators fitting in said grooves.

11. The combination with a multiple conductor cable having an insulated covering separately surrounding the conductors of said cable of a distributing block of dielectric material having a higher specific inductive capacity than the insulated material surrounding said conductors, said distributing block having a main passage therein for receiving said cable and having divergent branch passages for the conductors of said cable, projections on said block surrounding the outer ends of said branch passages, a housing for said distributing block and insulator bushings registering with the outer ends of said branch passages and surrounding said conductors where they extend through the wall of said housing.

12. The combination with a multiple conductor cable having insulating material surrounding the several conductors of said cable and having a metal sheath surrounding the entire cable of a distributing block of higher specific inductive capacity than the insulated covering for said conductors, said distributing block having a passage therein for receiving the main body of said cable and having diverging branch passages for the conductors of said cable, a housing enclosing said distributing block and having a tapered end secured to the metal sheath of said cable and gradually tapered outwardly from said cable, bushing insulators extending through said housing and registering with the outer ends of said branch passages for surrounding said insulators where they emerge from said housing, said distributing block having projections surrounding the outer ends of said branch passages and inter-fitting with the inner ends of said bushing insulators and a metallic coating disposed on the outer surface of said distributing block.

13. The combination with a multiple conductor cable having insulating material separately surrounding the conductors of said cable of a distributing block of insulated material having a passage for receiving said cable and diverging branch passages for said conductors and a housing enclosing said distributing block, said distributing block having a passage therethrough leading to the passages for said cable and conductors, the outer end of said passage being disposed in position to receive insulating compound and a projection on said distributing block surrounding the outer end of said passage and having the outer surface thereof covered with conducting material.

14. The combination with a conductor having a dielectric covering and an outer metal sheath of means for protecting said dielectric covering and preventing flash-over at the termination of said sheath, said means comprising a housing member of conducting material surrounding said dielectric covering and electrically connected with said sheath at the termination of said sheath, said housing member being gradually flared outwardly away from said dielectric covering and a sleeve of solid dielectric material having higher specific inductive capacity than said dielectric covering and having a tapered portion extending into the tapered opening between said dielectric covering and housing member to a point closely adjacent the point where said housing member begins to flare outwardly.

15. The combination with a conductor having a dielectric covering and an outer metal sheath of a housing for said conductor adjacent the termination of said metal sheath, said housing comprising a metallic bell having a tight union with said sheath at the termination of said sheath, the dielectric covering for said conductor being extended intact into said bell, the smaller end of said bell closely surrounding said covering at the point where said bell joins said sheath and being gradually flared outwardly from the surface of said covering and a porcelain sleeve having a tapered end fitted closely into the tapered opening between the outer surface of said dielectric covering and the inner surface of said bell.

16. In combination a cable having a plurality of conductors provided with separate dielectric coverings and with a dielectric covering surrounding all of said conductors and an outer metal sheath, an outlet for said conductors comprising a metallic bell having the smaller end thereof connected with said sheath at the termination of said sheath, said bell being gradually flared outwardly from the insulating covering for said cable, a porcelain block shaped to conform to the interior of said bell and having a tapered end portion extending into the tapered opening between said bell and the dielectric covering for said cable, said block having a main passage therein for receiving said cable and having gradually diverging branch passages for the separate conductors, and bushing insulators extending through the wall of said bell and having passages therein registering with the branch passages of said block for directing said conductors from said bell.

17. The combination with a multiple conductor cable having an insulating covering and an outer metal sheath, of a distributing block having a main opening and branch openings therein for separating the conductors of said cable, said block having one end thereof tapered and disposed adjacent the termination of said metal sheath, said tapered end being covered with conducting material.

In testimony whereof I have signed my name to this specification on this 12th day of March A. D. 1927.

ARTHUR O. AUSTIN.